No. 678,332. Patented July 9, 1901.
J. W. EBERMAN.
THERMOSTAT FOR OPERATING VALVES.
(Application filed Feb. 1, 1901.)
(No Model.)
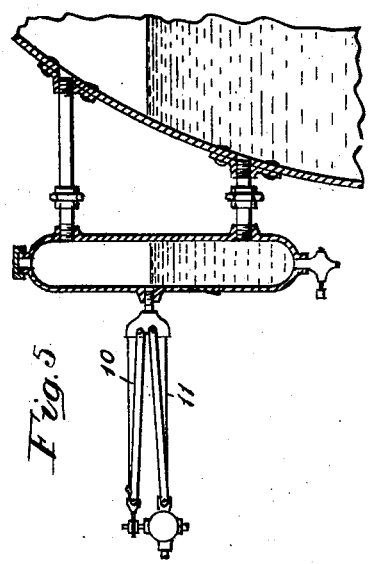
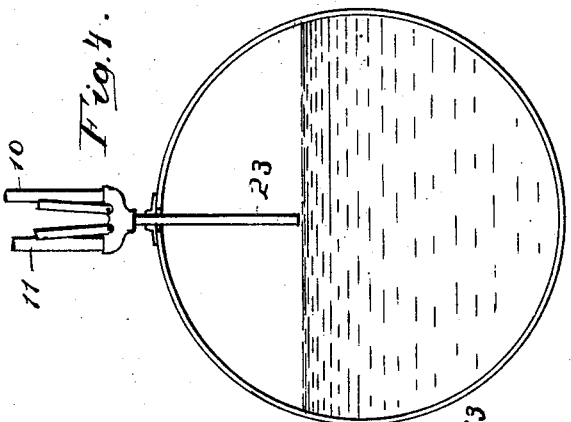
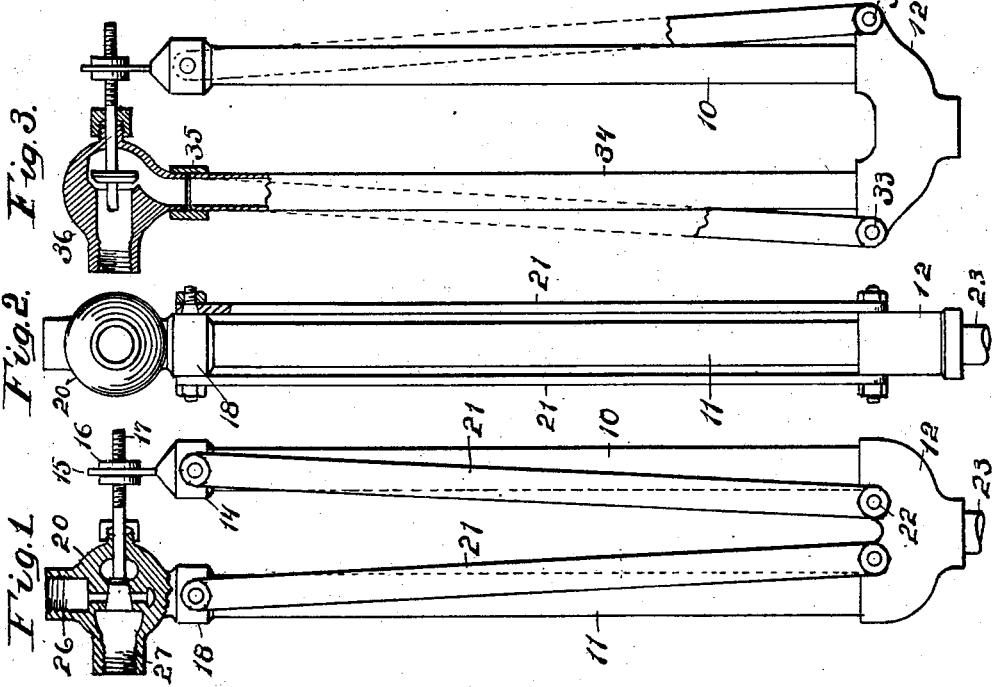
WITNESSES:
INVENTOR
J. W. Eberman,
BY
ATTORNEY

UNITED STATES PATENT OFFICE.

JOSEPH WILLIAM EBERMAN, OF BROOKLYN, NEW YORK, ASSIGNOR OF FIVE-EIGHTHS TO WILBUR F. STEELE, OF NEW YORK, N. Y.

THERMOSTAT FOR OPERATING VALVES.

SPECIFICATION forming part of Letters Patent No. 678,332, dated July 9, 1901.

Application filed February 1, 1901. Serial No. 45,652. (No model.)

*To all whom it may concern:*

Be it known that I, JOSEPH WILLIAM EBERMAN, a citizen of the United States, and a resident of Brooklyn borough, New York, in the county of Kings and State of New York, have invented certain new and useful Improvements in Thermostats for Operating Valves, of which the following is a specification.

The object of this invention is to provide a thermostat wherein the mechanism is operated by the thermal changes produced by steam and water; and the design is to so construct the same that there are no wearing parts or gearing to affect the efficiency of the device and which will have the requisite power to operate any valve or other mechanism to which it may be attached. It is also adapted for use in connection with a trap or for a low-water alarm or other uses; and it consists, essentially, of one or more pipes the terminal of which reaches to the normal water-line of a boiler or to the discharge-line of a trap, the pipe having attached thereto a non-expansible link in such a manner that when the pipe expands the line of stress will not be in line with said link, and as a result the pipe will be swung from its normal position in such a manner as to move a valve-stem, and thus operate the same. It further provides a means whereby the body of the thermostat serves as a conduit for steam when used in connection with a steam-trap, all of which will now be set forth in detail.

In the accompanying drawings, Figure 1 is a side elevation of my thermostat. Fig. 2 is an edge view. Fig. 3 is a side view, partly in section, showing the thermostat adapted for use as a trap; Fig. 4, a cross-section of a boiler, showing the thermostat attached thereto; and Fig. 5 showing preferred form of attachment to a boiler.

In constructing my invention I provide two parallel tubes 10 11, of equal length, secured at the base by screw-threads to a coupling-head 12, which has a threaded pipe connection, as shown at 13. The upper end of the pipe 10 has a head 14 screwed thereon and provided with an upwardly-projecting stem 15. This stem has therein an annular grooved nut 16, through which passes the threaded stem 17 of the valve. The other pipe 11 has a coupling 18, screw-threaded at both ends, but having a central partition, (not shown,) so that the valve 20, which is screwed into the upper end of the coupling, may be removed without affecting the thermostat connections.

It will be observed that the valve stem and seat are so arranged that the valve will be unseated when the upper ends of the two pipes 10 11 approach each other. In order to produce this action of the tubes and at the same time be able to provide the maximum effect due to the longitudinal expansion of the pipes 10 11, a pair of links 21 are attached at their upper ends to the head 14 and also to the coupling 18, and the lower ends of the links are secured by bolts or otherwise to the base connecting-piece 12 at points out of the control-line of the pipes, as at 22. The base connecting-piece 12 has a pipe 23 attached thereto, which extends down into the boiler and terminates at the normal water-line of the boiler, so that when the water is above the terminal of this pipe the pipes 10 11 contain water, or the temperature of the pipes is substantially the same as the temperature of boiling water; but when the water recedes from the end of the pipe 23 steam will enter pipes 10 11, and the increased temperature of the steam will cause them to expand, and as the links 21 are not susceptible to the change of temperature thus produced they will not be elongated. The result is that the pipes 10 11, although they may expand to an infinitesimal degree, will cause their upper ends to approach each other, Fig. 2, thus moving in the valve-stem 17 and causing the steam from the main line 26 to flow out through the pump-supply line 27 and setting the pump in motion. When the steam is again cut off from the pipe 23, the pipes 10 11 will again resume their normal relations to each other and the valve will be closed.

I may use any form of valve best adapted for the purpose, and I have herein indicated one form for this purpose. It is obvious that the thermostat may be attached to the water-gage cylinder or otherwise, so that the water-level of the boiler may be reached by the end of the tube, as shown at 23.

Instead of attaching the lower ends of the links, as in Figs. 1 and 2, to the connecting base-piece at points between the two pipes 10 11 I may connect them to points outside of the base of the pipes, as shown at 33, Fig. 5. In this case it is obvious that the expansional thrust will cause the upper ends of the pipes 10 34 to recede from each other, and the valve must therefore be so arranged that steam will be admitted through the valve to correspond with this change of motion. This latter form is preferable when the thermostat is used as a tray, the coupling 35 in this case having a passage through it, so that the valve 36 will receive steam or water through the pipe 34; but in other respects the construction is the same.

The valve-stem 17 being threaded, the annular nut 16 thereon is capable of adjustment, so as to provide for the throw of the valve-seat or to regulate the same for any pressure.

What I claim as new is—

1. A thermostat having a pair of parallel expansion-tubes and a valve attached to one tube and operated by the other tube, each tube having a non-expansible link hinged centrally to the head of the tube and the lower end of each link disposed out of the line of stress of said expansion tube or tubes.

2. A thermostat having a pair of parallel expansion-tubes joined to a common base, having a valve on the upper end of one tube and means for operating said valve on the other tube, a pair of links secured centrally in line at the upper end of each tube and attached at their lower ends to the base of the tubes at points to one side of the axial line of each tube.

3. A thermostat having a pair of parallel expansible tubes joined to a common base which supplies steam and water to said tubes, a valve on the upper end of one tube and an arm on the other tube, and means for operating said tube and a pair of non-expansible links each joining the head on each tube centrally in line of each tube, the lower ends of said tube being joined to each pipe so that the line of stress during expansion will deflect the upper ends of the pipes in opposite directions, as set forth.

4. A thermostat having a pair of slightly-separated parallel expansion-tubes secured to a common base provided with a single inlet, one of said tubes having at its upper end a valve with direct connections with the boiler through said tube and a stem which projects over the other tube, the other tube having at its upper end an arm and a nut, which engages with the valve-stem, said tubes having non-expansible links attached thereto at opposite ends, but out of alinement with the axis of said tube, as set forth.

5. A thermostat comprising two parallel expansible tubes, so secured to a common base which is connected with the steam and water space of a boiler, a valve on one of said tubes, and means for operating said valve connected with the other tube, a non-expansible link secured to the upper end of each tube in its axial line, and the lower end thereof secured to the common base to one side of the axis of said tube, one of said tubes serving as a steam or water conduit for the valve when the valve is open, as set forth.

6. A thermostat comprising a pair of slightly-separated parallel expansible tubes, secured to a common base which is provided with a tubular connection to the boiler, one of said tubes having thereon a valve in the line of a supply-steam and a threaded stem projecting over the upper end of the other tube, said latter tube having an arm provided with a nut to engage with the threaded stem, the head of each expansion-tube having attached thereto a non-expansible link in the axis of the tube, and the lower end of each link secured to the base at one side of the axial line of said tube, as set forth.

7. A thermostat comprising a pair of parallel expansible tubes secured to a common base and having communication with a boiler, the opposite ends of said tubes having attached thereto a valve and means for operating the same, each tube having a pair of non-expansible links secured at their upper ends centrally to the head, and at their lower ends to the common base out of alinement with the axis of the tube, as set forth.

Signed at New York, in the county of New York and State of New York, this 10th day of January, A. D. 1901.

JOSEPH WILLIAM EBERMAN.

Witnesses:
WILBUR F. STEELE,
JOHN W. WHALEN.